(12) United States Patent
    Scicluna (10) Patent No.: US 10,702,032 B2
(45) Date of Patent: Jul. 7, 2020

(54) DOUBLE-SIDED WHEEL ASSEMBLY AND METHODS THEREOF

(71) Applicant: TUMI, INC., Edison, NJ (US)

(72) Inventor: Paul V. Scicluna, Penndel, PA (US)

(73) Assignee: TUMI, INC., Edison, NJ (US)

( * ) Notice: Subject to any disclaimer, the term of this patent is extended or adjusted under 35 U.S.C. 154(b) by 520 days.

(21) Appl. No.: 14/093,382

(22) Filed: Nov. 29, 2013

(65) Prior Publication Data

US 2015/0150347 A1    Jun. 4, 2015

(51) Int. Cl.
    *A45C 5/14*     (2006.01)
    *A45C 13/00*    (2006.01)
    *B60B 33/00*    (2006.01)

(52) U.S. Cl.
    CPC ............ *A45C 13/00* (2013.01); *A45C 5/14* (2013.01); *B60B 33/0023* (2013.01); *B60B 33/0028* (2013.01); *B60B 33/0042* (2013.01); *B60B 2200/45* (2013.01); *B60B 2900/3312* (2013.01)

(58) Field of Classification Search
    CPC .......... A45C 5/14; A45C 13/36; A45C 13/02; A45C 5/02; A45C 5/03; B60B 33/0028
    USPC .......... 190/18 R, 18 A; 280/37, 43.1, 47.17, 280/47.38, 651, 79.2, 87.042; D3/279, D3/318, 375; 16/35 R, 47
    See application file for complete search history.

(56) References Cited

U.S. PATENT DOCUMENTS

| 2,541,514 A | 2/1951 | Herold |
| 4,327,462 A * | 5/1982 | Eggleston ............... B60B 33/00 16/47 |
| 9,961,974 B2 * | 5/2018 | Hillaert ................... A45C 5/14 |
| 2004/0163208 A1 | 8/2004 | Kuo |
| 2010/0230223 A1 * | 9/2010 | Wu .......................... A45C 5/143 190/18 A |
| 2011/0056788 A1 * | 3/2011 | Jackson .................. A45B 23/00 190/2 |
| 2012/0180259 A1 * | 7/2012 | Frame .................... A47B 91/12 16/47 |

FOREIGN PATENT DOCUMENTS

| CN | 201633468 U | 11/2010 |
| CN | 102059918 A | 5/2011 |
| CN | 203302510 U | 11/2013 |
| DE | 202008004038 U1 | 7/2009 |
| JP | 200983706 A | 4/2009 |

(Continued)

OTHER PUBLICATIONS

Office Action from corresponding European Application No. 14816017.9 dated Jan. 16, 2018.

(Continued)

*Primary Examiner* — Sue A Weaver
(74) *Attorney, Agent, or Firm* — Lando & Anastasi, LLP (57) ABSTRACT

Embodiments of the present disclosure generally relate to double-sided wheel assemblies and methods thereof. In one embodiment, double-sided wheel assembly is provided that may comprise a wheel member comprising a first wheel; a second wheel; and a center member disposed between the first wheel and the second wheel, the first wheel and second wheel adapted to distribute the load of the luggage; a wheel carriage for supporting the wheel member; and a wheel support base adapted to couple with the wheel carriage.

20 Claims, 13 Drawing Sheets

(56) References Cited

FOREIGN PATENT DOCUMENTS

| JP | 201137416 A | 2/2011 |
| WO | 2013072312 A1 | 5/2013 |

OTHER PUBLICATIONS

Notice of Reasons for Rejection in application No. JP 2016-529927 dated Nov. 20, 2018.
Office Action from corresponding Chinese Application No. 201480061754.6 dated Sep. 28, 2016.

* cited by examiner

DOUBLE-SIDED WHEEL ASSEMBLY AND METHODS THEREOF

BACKGROUND

Field of the Invention

Embodiments of the present disclosure generally relate to double-sided wheel assemblies and methods thereof. More specifically, embodiments of the present disclosure relate to double-sided wheel assemblies for luggage, the wheel assemblies including multiple wheels for improving the turning radius of luggage.

Description of the Related Art

Travelers often transport luggage through heavily trafficked areas, such as airports, train stations, city streets, or the like. When traveling through these highly trafficked areas, it is often difficult to maneuver luggage around other people and objects in the traveler's path. Due to the limited turn radius of existing luggage, travelers often find it difficult, for example, to maneuver their luggage around other travelers, other luggage, stations, curb ramps, train/airplane aisles, in shopping areas, in restaurants, through offices, through security checkpoints, to name a few. These obstacles and many others pose a risk to the safety of the traveler and the luggage.

If a traveler is unable to maneuver around an object successfully, the traveler may accidentally bump or contact an object with their luggage, and potentially damage the luggage and/or the object. In addition, the traveler may accidentally contact another person with the luggage, which cause injury to the other person and create potential liability risks. In addition, bumping the luggage into an object or a person may cause the traveler to lose his or her balance and potentially injure themselves.

Existing luggage wheels only allow for a limited turning radius due to the fact that they include single wheels. The base of a single wheel contacts a significant portion of the ground surface, thereby resisting wheel rotation and limiting both luggage load capacity and turning radius. Thus, there is a need for a wheel assembly for improving the turning radius and load capacity of luggage.

SUMMARY

Embodiments of the present disclosure generally relate to double-sided wheel assemblies and methods thereof. More specifically, embodiments of the present disclosure relate to double-sided wheel assemblies for luggage, the wheel assemblies including multiple wheels for improving the turning radius of luggage.

In one embodiment of the present disclosure, a double-sided wheel assembly may comprise a wheel member that may comprise a first wheel; a second wheel; and a center member disposed between the first wheel and the second wheel, the first wheel and second wheel adapted to distribute the load of the luggage; a wheel carriage for supporting the wheel member; and a wheel support base adapted to couple with the wheel carriage.

In another embodiment of the present disclosure, a suitcase may comprise a storage cavity for storing items; a closure member for closing the storage cavity, the closure member comprising a zipper; a double-sided wheel assembly for rolling the suitcase, the double-sided wheel assembly comprising a wheel member comprising a first wheel; a second wheel; and a center member disposed between the first wheel and the second wheel, the first wheel and second wheel adapted to distribute the load of the luggage; a wheel carriage for supporting the wheel member; and a wheel support base adapted to couple with the wheel carriage.

In yet another embodiment of the present disclosure, a method for using a double-sided wheel assembly may comprise providing a double-sided wheel assembly that may comprise a wheel member that may comprise a first wheel; a second wheel; and a center member disposed between the first wheel and the second wheel, the first wheel and second wheel adapted to distribute the load of the luggage; a wheel carriage for supporting the wheel member; a wheel support base adapted to couple with the wheel carriage; a luggage base adapted to couple with the wheel support base and secure the wheel support base to the luggage, the luggage base comprising a connection member adapted to receive a fastener for securing the assembly to the luggage; and securing the wheel assembly to the luggage

BRIEF DESCRIPTION OF THE DRAWINGS

So the manner in which the above recited features of the present disclosure can be understood in detail, a more particular description of embodiments of the present disclosure, briefly summarized above, may be had by reference to embodiments, which are illustrated in the appended drawings. It is to be noted, however, the appended drawings illustrate only typical embodiments of embodiments encompassed within the scope of the present disclosure, and, therefore, are not to be considered limiting, for the present disclosure may admit to other equally effective embodiments, wherein.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present disclosure generally relate to double-sided wheel assemblies and methods thereof. More specifically, embodiments of the present disclosure relate to double-sided wheel assemblies for luggage, the wheel assemblies including multiple wheels for improving the turning radius of luggage.

In exemplary embodiments, a luggage wheel assembly may comprise a double-sided wheel member comprising a first wheel and a second wheel. When in use, the first wheel and the second wheel may be in contact with a relatively small portion of the ground when compared with a single wider wheel. Using a double-sided wheel decreases the ground contact and increases the load capacity of luggage while improving the turn radius of the luggage. Although two wheels are depicted in the figures, any number of wheels consistent with the present disclosure may be used. For example, three or more wheels may be included. In contrast to the multiple wheel embodiment of the present disclosure, a single wide wheel includes a center portion that contacts the ground and rotates slower than an outer portion of the wheel, resisting rotation and limiting turn radius. This center portion of the wheel contacts the ground, leading to increased friction that also limits the turn radius of the luggage. In exemplary embodiments of the present invention, more than one wheel may be included which may effectively remove this center portion, thereby improving the turn radius of the luggage. In accordance with exemplary embodiments, multiple wheels may be used in tandem on the same wheel axis, thereby decreasing resistance to turning and improving the turn radius of the luggage.

Figure 1:
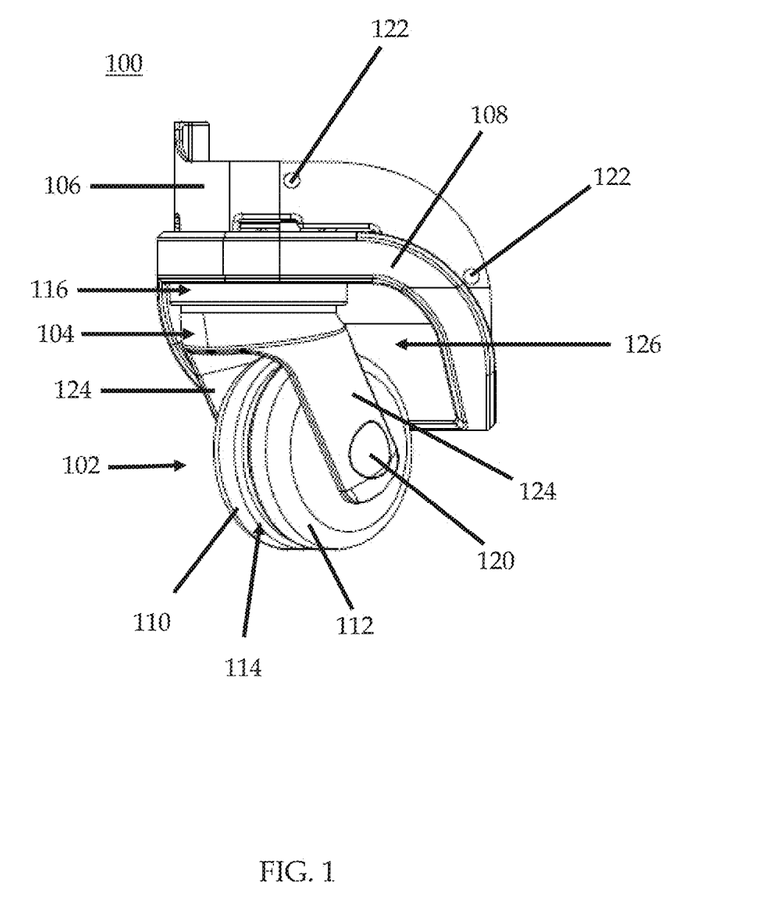
FIG. 1 depicts a perspective front side view of a double-sided wheel assembly in accordance with embodiments of the present invention.
Figure 3:
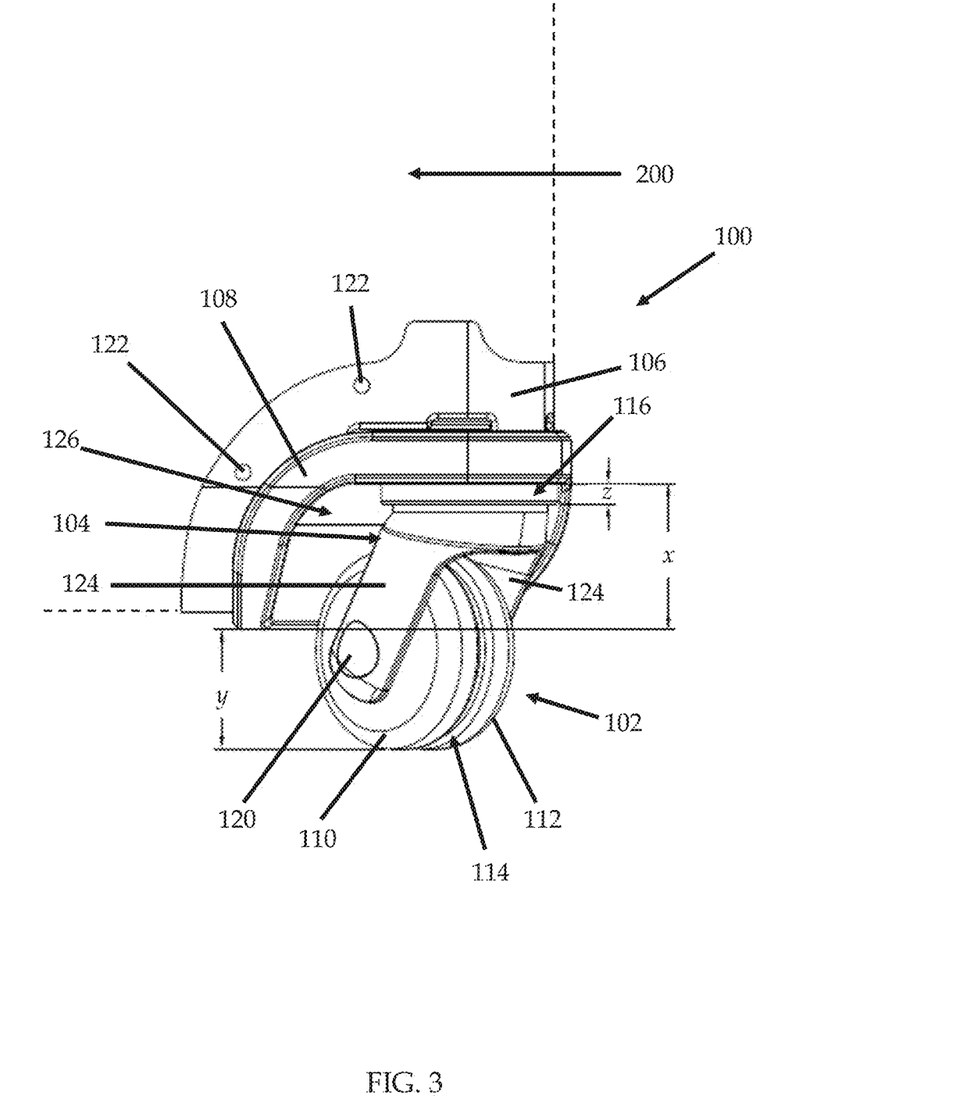
FIG. 3 depicts a perspective second front side view of the double-sided wheel assembly shown in FIG. 1 in accordance with embodiments of the present invention.

FIGS. 1 and 3 depict perspective views of a double-sided wheel assembly 100 in accordance with embodiments of the present disclosure. In exemplary embodiments, the wheel assembly 100 may comprise a luggage base 106, a wheel support base 108, a wheel carriage 104, a wheel member 102. The luggage base 106 may generally be adapted to secure the wheel assembly 100 to a piece of luggage 200. In some embodiments, the wheel assembly 100 may comprise one or more connection members 122 adapted to receive a fastener for securing the wheel assembly 100 to a piece of luggage 200. Although two connection members 122 are depicted in many of the figures, any number of connection members 122 consistent with the present disclosure is contemplated. For example, 0 or 5 connection members 122 may be included.

In exemplary embodiments, the luggage base 106 may be generally convex and may conform to an outer surface of a piece of luggage 200. In some embodiments, the curvature of the luggage base 106 may be rounded, square, or the like. In some embodiments, the luggage base 106 may be integral with the luggage 200, may be permanently attached to the luggage, and/or may be detachable. The luggage base 106 may be adapted to couple with the luggage, behind the surface of the luggage 200, wherein the luggage base 106 is substantially hidden from view. The luggage base 106 may comprise a substantially rigid material to resist damage when contacted by an object. The luggage base 106 may comprise a lower exterior portion adapted to couple with a wheel support base 108.

In exemplary embodiments, a wheel support base 108 may be adapted to couple with the luggage base 106 on a top surface of the wheel support base 108 and couple with a wheel carriage 104 on an opposing side. In some embodiments, a luggage base 106 may not be included and the wheel support base 108 may couple directly with the luggage 200 and/or the like. The wheel support base 108 may comprise a protrusion that extends past the surface of the luggage 200. The wheel support base 108 may comprise a substantially rigid material for protecting the luggage 200. The wheel support base 108 may comprise a wheel support connection 116 for coupling with a wheel carriage 104 and/or the like. The wheel support connection 116 may extend past a lower portion of the wheel support base 108. In some embodiments, the wheel support base 108 may comprise a wheel void 126. The wheel void 126 may be a generally curved portion of the wheel support base 108 for allowing a wheel member 102 to freely rotate.

In exemplary embodiments, the wheel assembly 100 may comprise a wheel carriage 104. In some embodiments, the wheel carriage 104 may comprise a wheel fork, and/or the like. The wheel carriage 104, may comprise one or more prongs 124 adapted to support a wheel member 102, or the like. The prongs 124 may be disposed on opposing sides of the wheel carriage 104 and may be adapted to support the wheel member 102 between the prongs 124. In some embodiments, the one or more prongs 124 may be adapted to offset the wheel member 102 from a center axis of the support connection 116 and/or the like. In some embodiments, the wheel assembly 100 may comprise a central shaft (not shown) adapted to secure the wheel carriage 104 to the support base 108, or the like. The central shaft may be adapted to allow the carriage to freely rotate about an axis. The wheel carriage 104 may comprise an opening for receiving an axle (not shown) and supporting the wheel member 102, or the like. In some embodiments, the wheel carriage 104 may comprise a wheel cap 120, or the like, for capping the end of the axle on one or more prongs 124. In some embodiments, the wheel carriage 104 may be adapted to couple with a wheel support connection 116. In some embodiments, the wheel carriage 104 may be disposed closer to a ground surface than the support base 108, the luggage base 106, and/or the like.

In some embodiments, the wheel member 102 may comprise more than one wheel. The wheel member may comprise a first wheel 110, a second wheel 112, and/or a center member 114. The first and second wheels 110, 112 may be evenly spaced apart with the center member 114. In some embodiments, the center member 114 may comprise a bearing, and/or the like. For example, the center member 114, may comprise ball bearings, roller bearings, ball thrust bearings, roller thrust bearings, tapered roller thrust bearings, needle bearings, and/or the like. In some embodiments, the center member 114 may comprise an substantially annular shape and may be disposed and/or coupled with a first wheel 110 and a second wheel 112. Use of a first wheel 110, a second wheel 112, and/or additional wheels may decrease the ground contact of the wheel surface when compared with a single wider wheel, thereby increasing the load capacity of the luggage 200 and improving the turn radius of the luggage 200 such that the luggage 200 may make tighter turns.

In exemplary embodiments, the distance between the lowermost portion of the wheels 110, 112, and a bottom edge of the wheel support base 108, indicated by reference y in FIG. 3, may comprise a substantial portion of the wheel member 102. For example, the distance y may comprise between 15-60 mm, and may comprise 34 mm and/or the like. In exemplary embodiments, the distance between a bottom edge of the wheel support base 108 and a top portion of the wheel support connection 116, indicated by reference x in FIG. 3, may comprise between 20-80 mm, and may comprise 42 mm and/or the like. In exemplary embodiments, the distance between a top of the wheel support connection 116 and a bottom of the wheel support connection 116, indicated by reference z in FIG. 3, may comprise between 3-9 mm, and may comprise 6 mm and/or the like. In some embodiments, the diameter of the wheels 110, 112 may comprise between 25-100 mm. For example, in some embodiments, the diameter of the wheels 100, 112 may comprise 57.15 mm.

Figure 2:
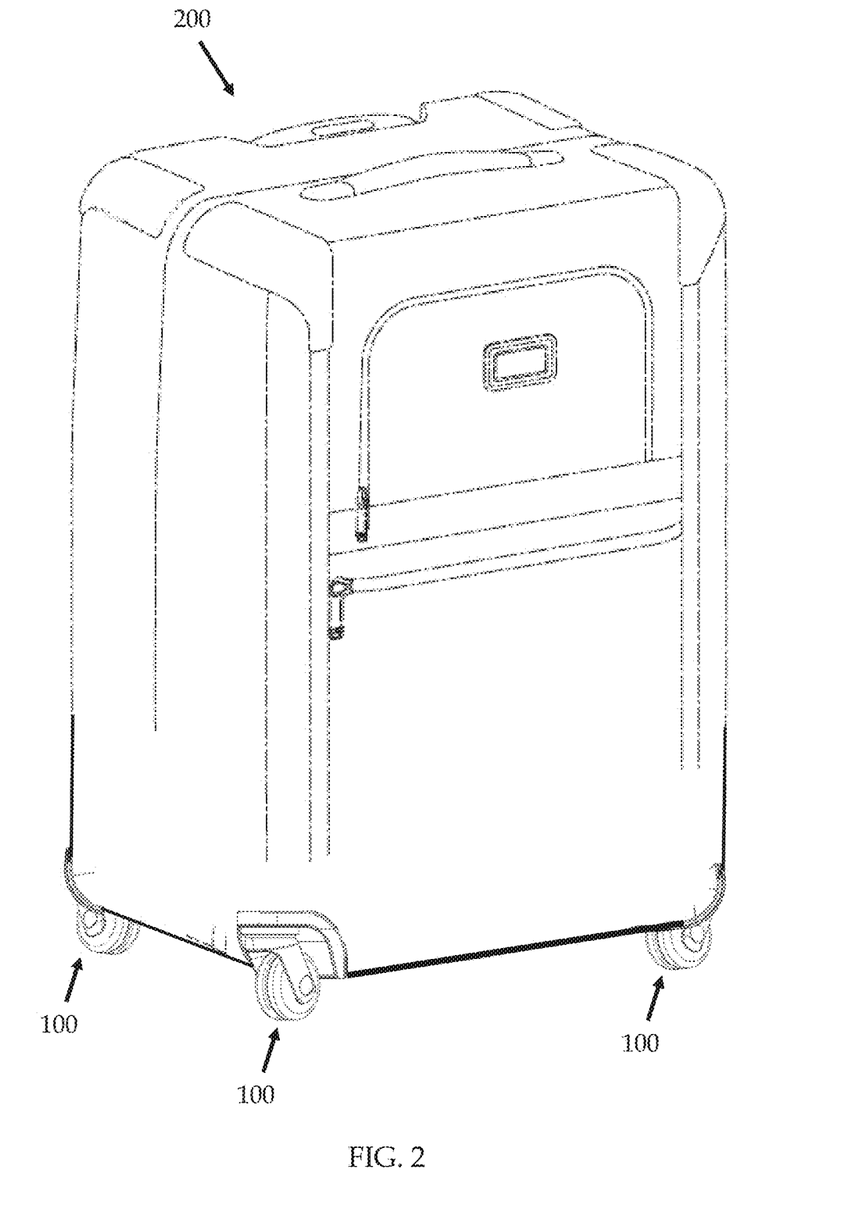
FIG. 2 depicts a perspective view a piece of luggage including a double-sided wheel assembly in accordance with embodiments of the present invention.

FIG. 2 depicts a perspective view a piece of luggage 200 including a double-sided wheel assembly 100 in accordance with embodiments of the present invention. The wheel assembly 100 may be adapted to couple with and/or fit on at least one lower corner of a piece of luggage 200. In some exemplary embodiments, a piece of luggage 200 may comprise two or four wheel assemblies 100 disposed on lower corners of the luggage. In some embodiments, the wheel assemblies 100 or at least a portion of the wheel assemblies 100 are adapted to be detachable from the luggage for ease of maintenance, and/or the like. In some embodiments, additional wheel assemblies 100 may be included in the side surfaces of the luggage 200 between two or more wheel assemblies 100 disposed on corners of the luggage 200, and/or the like.

Figure 4:
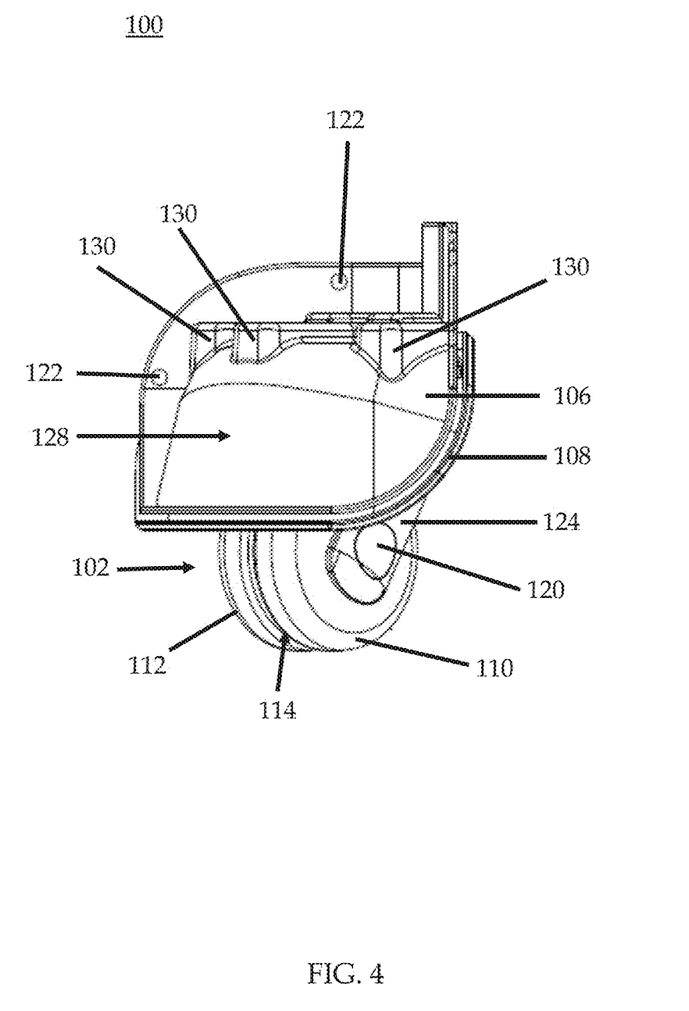
FIG. 4 depicts a perspective back side view of the double-sided wheel assembly shown in FIG. 1 in accordance with embodiments of the present invention.
Figure 5:
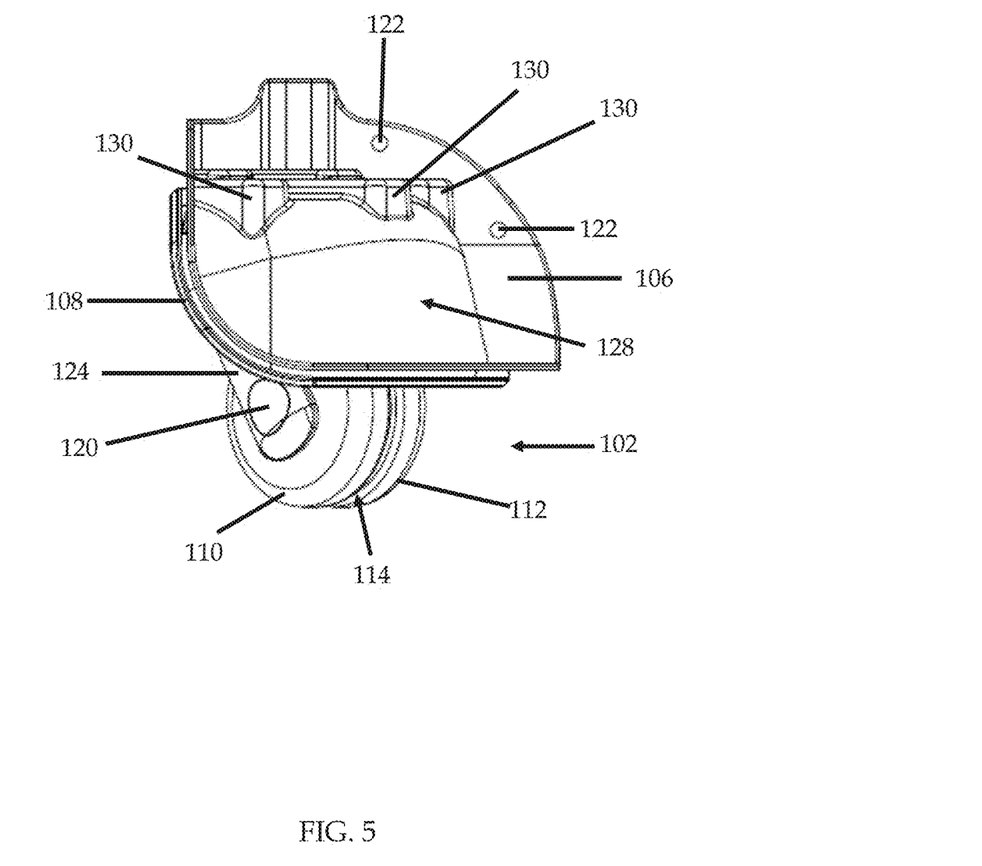
FIG. 5 depicts a perspective back second side view of the double-sided wheel assembly shown in FIG. 1 in accordance with embodiments of the present invention.

FIGS. 4 and 5 depict perspective back side views of the double-sided wheel assembly 100 shown in FIG. 1 in accordance with embodiments of the present invention. In accordance with exemplary embodiments, the connection members 122, wheel member 102, luggage base 106, wheel support base 108, prong 124 wheel cap 120, first wheel 110, center member 114, second wheel 112 are the same and/or similar to the same elements depicted and described in FIGS. 1-3. As shown in FIGS. 4-5, the luggage base 106 may comprise an interior portion 128 and one or more base protrusions 130 and/or the like. In some embodiments, the interior portion 128 may be curved and may mimic the curvature of the wheel void 126 depicted in FIGS. 1-3. In some embodiments, the wheel assembly 100 may comprise one or more protrusions 130 on the top interior surface of the luggage base 106. The protrusions 130 may be adapted to couple with a piece of luggage. The protrusions 130 may be spread across the interior surface 128 and/or the like. The protrusions 130 may be adapted to prevent the wheel assembly 100 from becoming detached from the luggage and/or resist lateral forces acting upon the wheel assembly 100.

Figure 6:
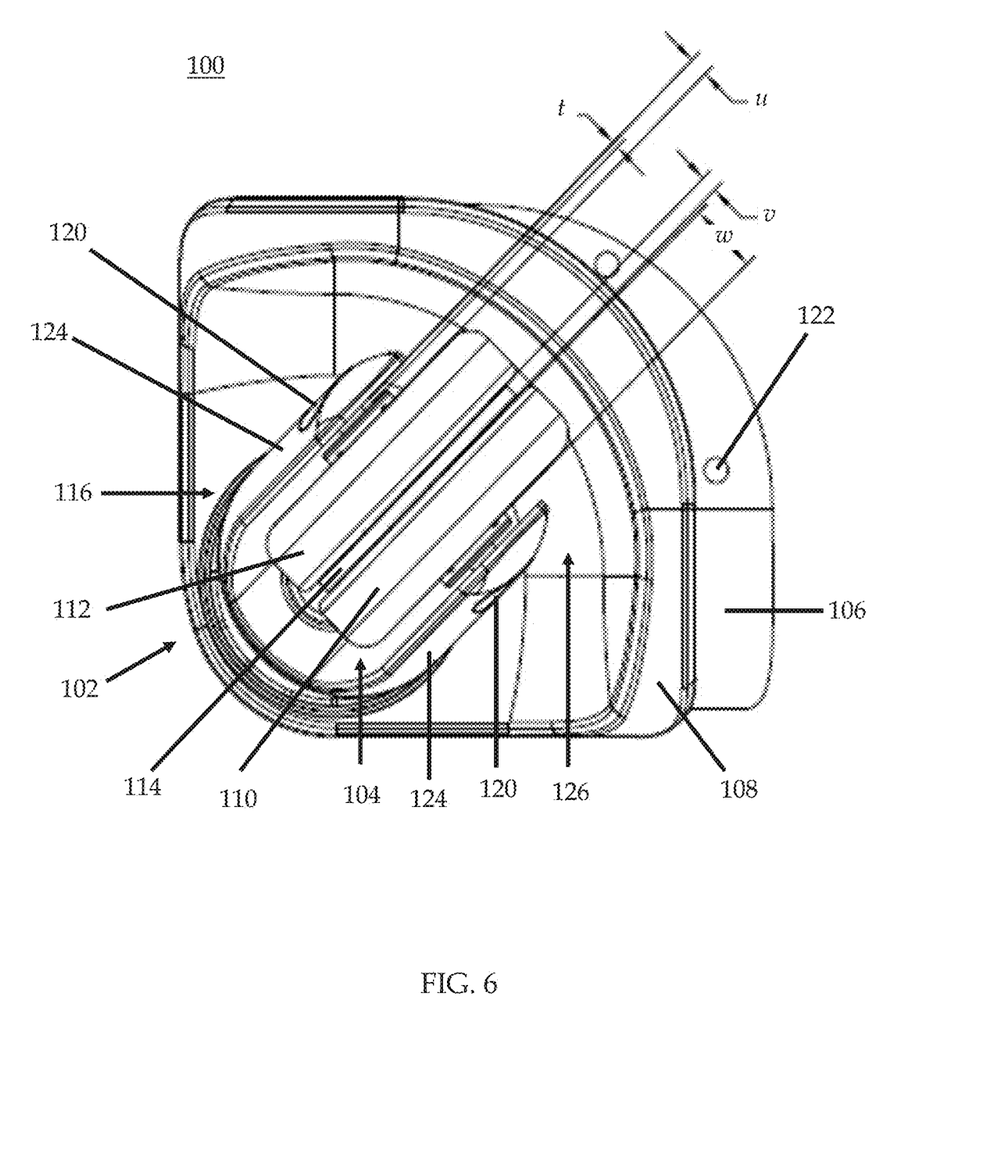
FIG. 6 depicts a bottom view of the double-sided wheel assembly shown in FIG. 1 in accordance with embodiments of the present invention.
Figure 7:
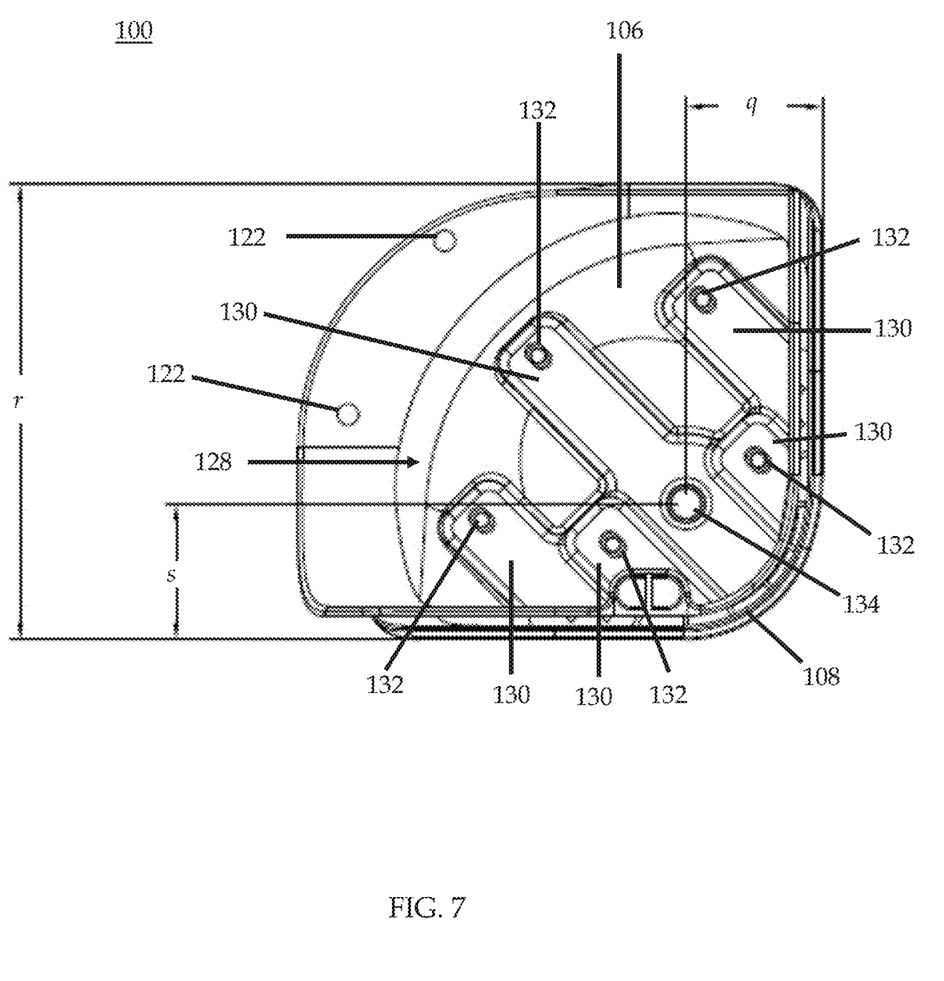
FIG. 7 depicts a top view of the double-sided wheel assembly shown in FIG. 1 in accordance with embodiments of the present invention.
Figure 8:
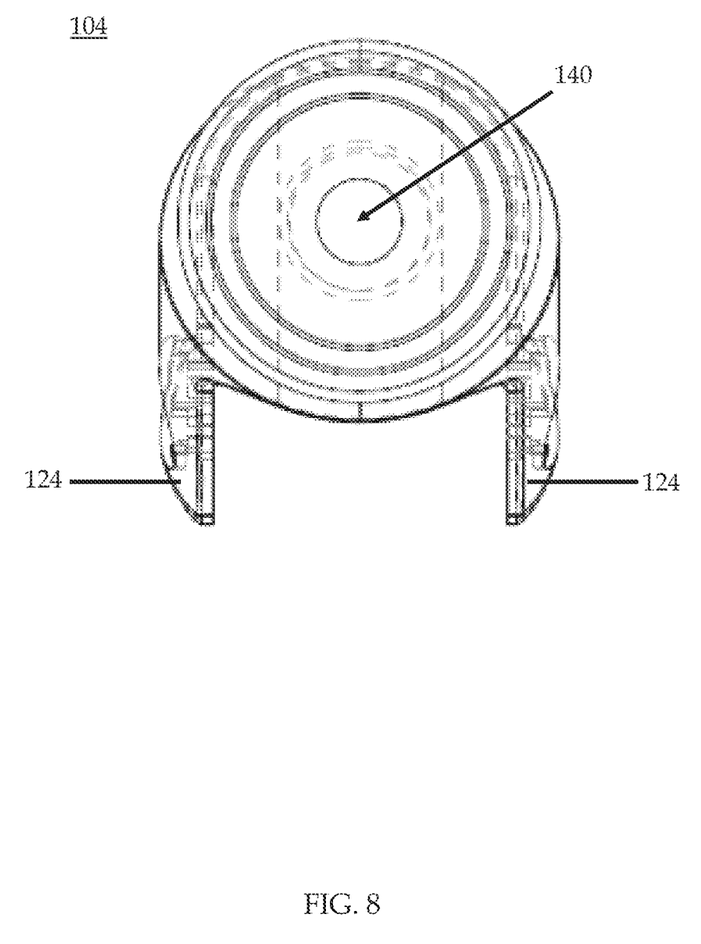
FIG. 8 depicts perspective top view of a wheel fork in accordance with embodiments of the present invention.
Figure 9:
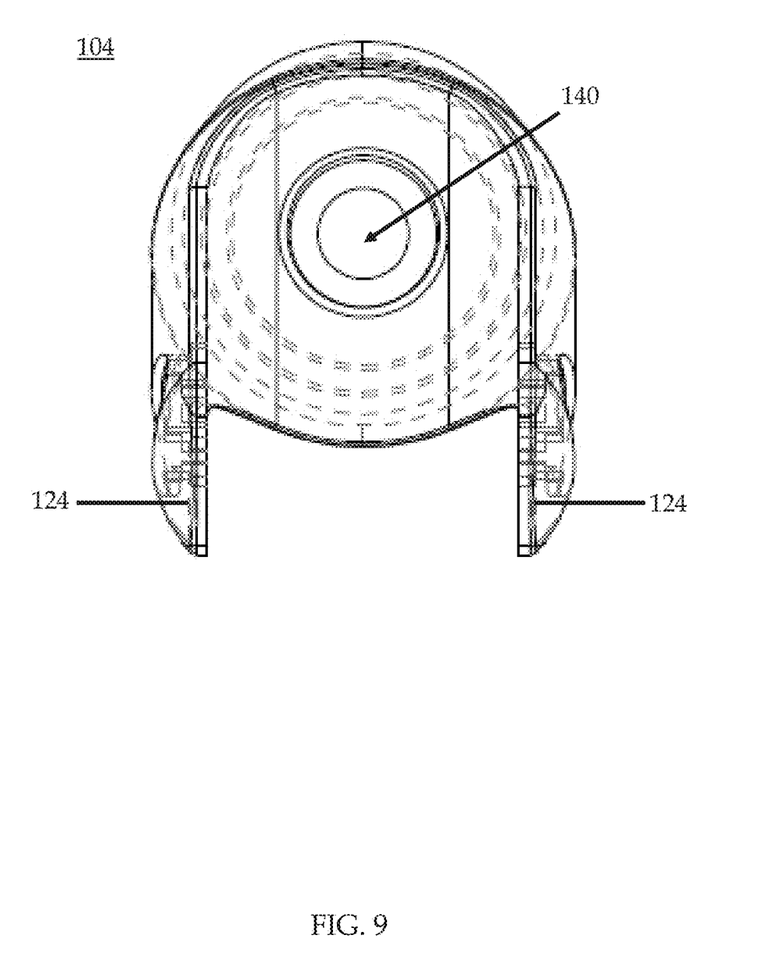
FIG. 9 depicts perspective bottom view of a wheel fork in accordance with embodiments of the present invention.
Figure 10:
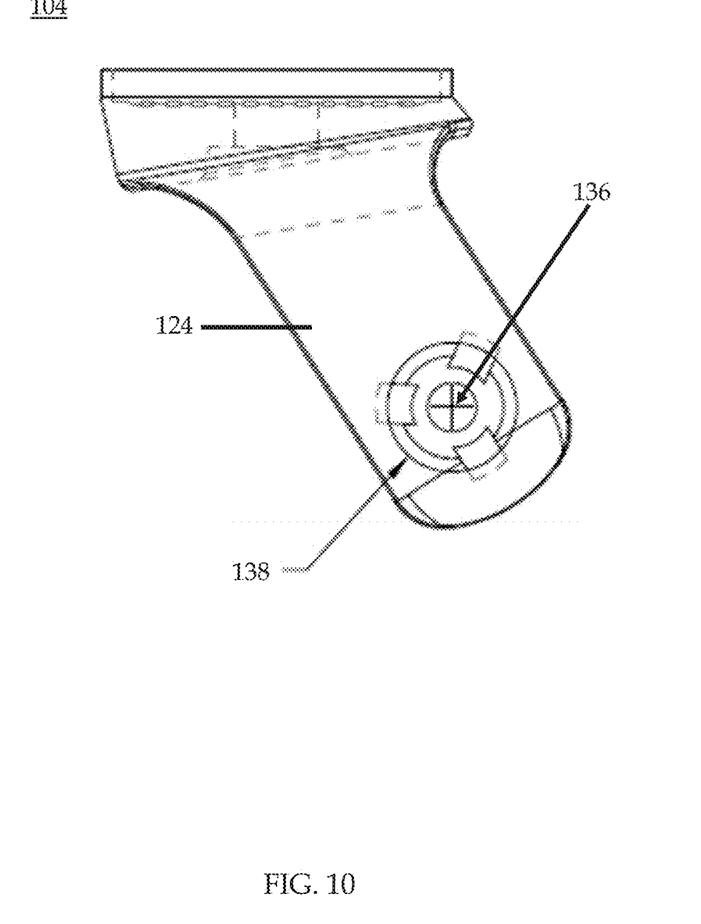
FIG. 10 depicts perspective side view of a wheel fork in accordance with embodiments of the present invention.
Figure 11:
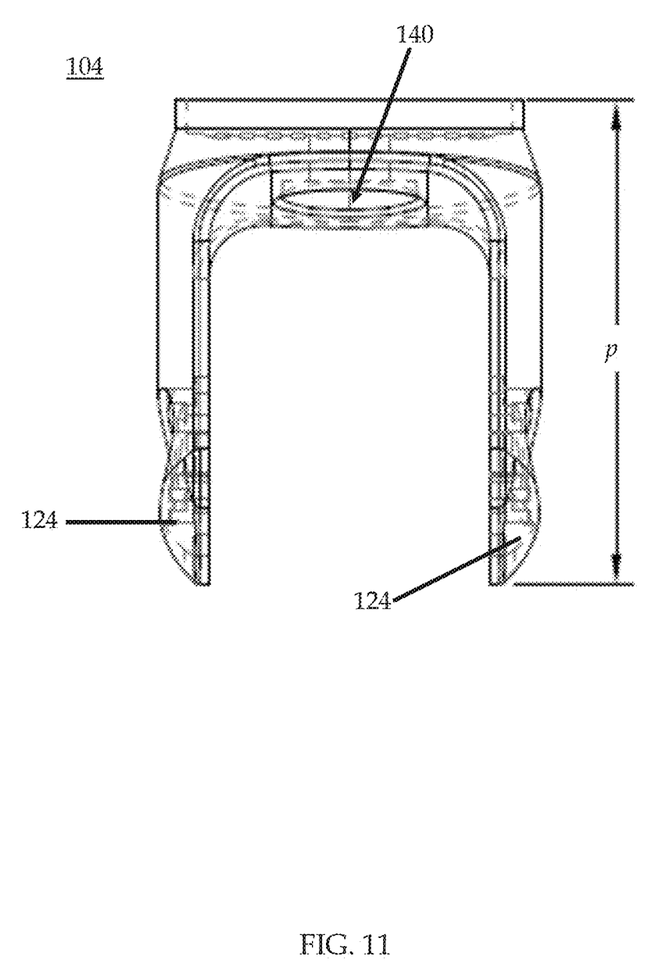
FIG. 11 depicts perspective back view of a wheel fork in accordance with embodiments of the present invention.
Figure 12:
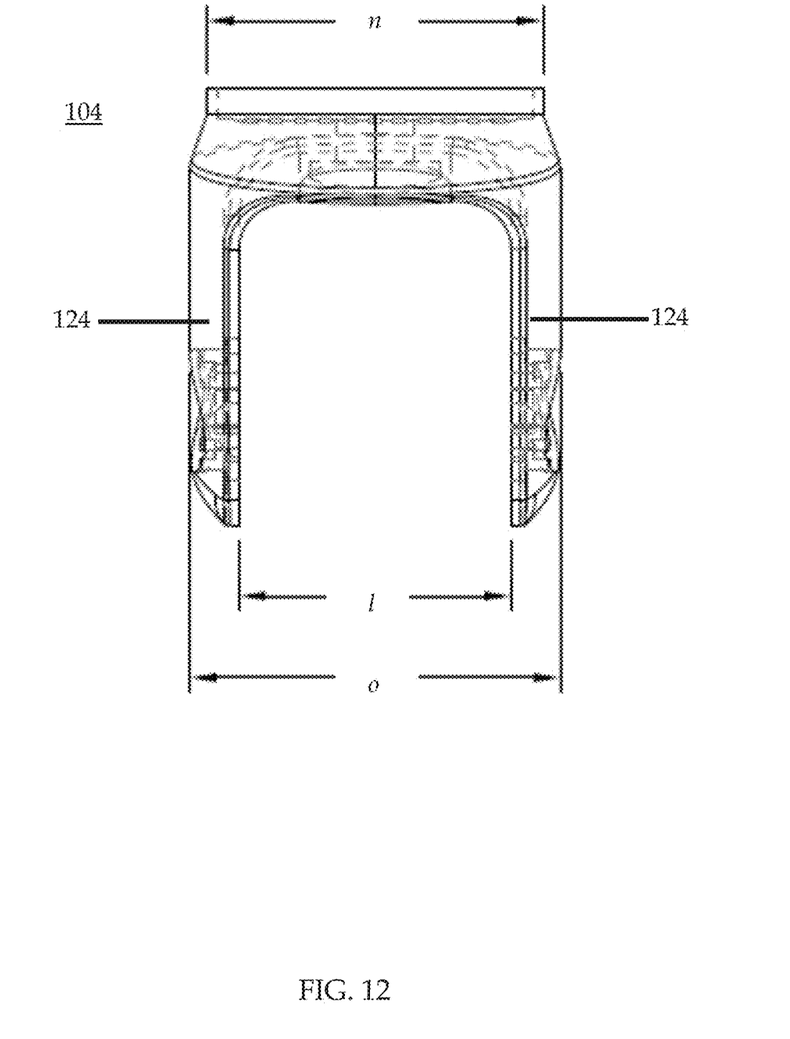
FIG. 12 depicts perspective front view of a wheel fork in accordance with embodiments of the present invention.

FIGS. 6 and 7 depict top and bottom views of the double-sided wheel assembly 100 shown in FIGS. 1-5 in accordance with embodiments of the present invention. In accordance with exemplary embodiments, the connection members 122, wheel member 102, luggage base 106, wheel support base 108, wheel void 126, interior portion 128, wheel carriage 104, wheel support connection 116, prong 124 wheel cap 120, first wheel 110, center member 114, second wheel 112, base protrusions 130, are the same and/or similar to the same elements depicted and described in FIGS. 1-5.

In exemplary embodiments, the wheel assembly 100 may comprise hubs on the exterior surface of the wheels 110, 112 and the distance between an interior surface of a prong 124 and the hub, depicted by reference t, and may comprise between 0.5 and 2 mm, for example, 1.1 mm. In exemplary embodiments, the distance between an interior surface of a prong 124 and an exterior surface of a wheel 110, 112, depicted by reference u, may comprise between 0.5 and 7 mm, for example, 3.5 mm. In exemplary embodiments, the width of the center member 114, depicted by reference v, may comprise between 0.5 and 7 mm, for example, 3 mm. In exemplary embodiments, the width of a wheel 110, 112, depicted by reference w, may comprise between 5 and 26 mm, for example, 13 mm.

In exemplary embodiments, the protrusions 130 may be disposed across the top surface of the luggage base 106 to resist movement, and/or the like. The protrusions 132 may comprise a fork base aperture 132 and or the like adapted to secure the wheel assembly 100, the luggage base 106 and/or the like to the wheel support base 108 and/or the luggage. In exemplary embodiments, the luggage base 106 may comprise a shaft aperture 134 for receiving a shaft connected to the wheel member 102 and/or the wheel carriage 104. In exemplary embodiments, distances between the center of the shaft aperture 134 and an exterior edge of the support base 108, depicted by reference q and s, may comprise between 15 and 60 mm, for example, 29 mm. In exemplary embodiments, the length of the wheel assembly 100, depicted by reference r, may comprise between 50 and 200 mm, for example, 97 mm, or the like.

FIGS. 8-12 depict perspective views of a wheel carriage 104 in accordance with embodiments of the present invention. In accordance with exemplary embodiments, the wheel carriage 104 and prongs 124 are the same as those depicted and described with reference to FIGS. 1-7. In exemplary embodiments, the wheel carriage 104 may comprise a carriage shaft aperture 140 for accepting an shaft coupled with the wheel member 102. In exemplary embodiments, the wheel carriage 104 may comprise an axle aperture adapted to receive an axle for passing through and/or coupling with the wheel member 102. In exemplary embodiments, the wheel carriage 104 may comprise a wheel cap housing 138 for accepting and coupling with a wheel cap 120 and/or the like. In exemplary embodiments, the width of the center member 114, depicted by reference v, may comprise between 0.5 and 7 mm, for example, 3 mm.

In exemplary embodiments, the height of the wheel carriage 104, depicted by reference p, may comprise between 25 and 120 mm, for example, 58 mm. In exemplary embodiments, the width of a top portion of the wheel carriage 104, depicted by reference n, may comprise between 25 and 90 mm, for example, 44.5 mm. In exemplary embodiments, the width between prongs 124 of the wheel carriage 104, depicted by reference l, may comprise between 17 and 80 mm, for example, 36 mm. In exemplary embodiments, the width between outermost edges of the prongs 124 of the wheel carriage 104, depicted by reference o, may comprise between 17 and 80 mm, for example, 36 mm. In exemplary embodiments, the width of the side of a prong 124 may comprise between 12 and 50 mm, for example 24.8 mm. In some embodiments, the diameter of the wheel cap housing 138 may be between 8 mm and 34 mm, for example 16.4 mm.

Figure 13:
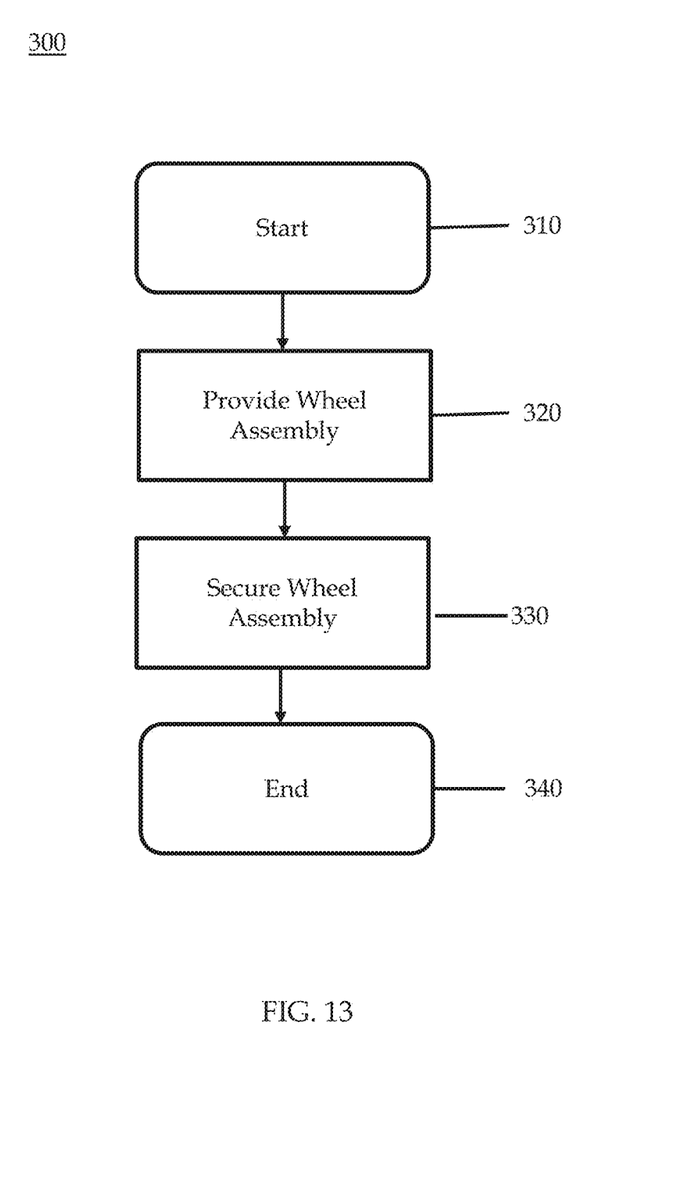
FIG. 13 depicts a flow diagram illustrating an exemplary method for using a double-sided wheel assembly in accordance with embodiments of the present invention.

FIG. 13 depicts a flow diagram illustrating an exemplary method for using a double-sided wheel assembly 100 in accordance with embodiments of the present invention. In exemplary embodiments, the method 300 may comprise providing and installing a wheel assembly 100 in accordance with exemplary embodiments. The method 300 may be carried out using the components described above. It should further be appreciated, the steps of method 300 may be carried out in any order (e.g., step 330 may occur before step 320), unless otherwise explicitly specified by the steps of the exemplary method. For ease, exemplary methods represented in FIG. 13 are described with reference to the wheel assembly 100 described above. The method 300 may be carried out using other embodiments as well. The method 300 begins at step 310. At step 320, a wheel assembly 100 is provided. At step 330, the wheel assembly 100 may be secured to a piece of luggage 320 using, for example, one or more connection members 122. After the wheel assembly 100 has been installed, the method ends at step 340.

While the foregoing is directed to embodiments of the present disclosure, other and further embodiments of the disclosure may be devised without departing from the basic scope thereof. It is also understood that various embodiments described herein may be utilized in combination with any other embodiment described, without departing from the scope contained herein. In addition, embodiments of the present disclosure are further scalable to allow for additional clients and servers, as particular applications may require.

What is claimed is:

1. A suitcase for use on a ground surface, the suitcase comprising:
    a storage cavity for storing items;
    a closure member for closing the storage cavity;
    a double-sided wheel assembly for rolling the suitcase, the double-sided wheel assembly including a wheel member comprising:
        a first wheel oriented on a first plane;
    a second wheel oriented on a second plane parallel to the first plane;
    a center member disposed entirely between and coupled with the first wheel and the second wheel and oriented on a third plane parallel to the first plane and the second plane, wherein the center member has a substantially annular shape and is configured to function as at least one bearing, the first wheel, the second wheel and the center member adapted to distribute a load of the suitcase to the first and the second wheel, wherein the center member rotates freely in a tangential direction relative to each of the first and second wheels when the wheel member is in use on a ground surface;
    a wheel carriage for supporting the wheel member; and
    a wheel support base adapted to couple with the wheel carriage; and
    a luggage base adapted to couple with the wheel support base and secure the wheel support base to the suitcase,
    wherein the luggage base comprises a connection member adapted to receive a fastener for securing the assembly to the suitcase.

2. The suitcase of claim 1, wherein the center member comprises at least one of a roller bearing, a ball thrust bearing, a roller thrust bearing, a tapered roller thrust bearing, or a needle bearing.

3. The suitcase of claim 1, wherein the luggage base comprises a substantially convex shape conforming to an outer surface of the suitcase.

4. The suitcase of claim 1, wherein the luggage base comprises a protrusion adapted to couple the luggage base to the suitcase and restrict lateral movement.

5. The suitcase of claim 1, further comprising:
    an axle disposed through each of the first wheel, the second wheel, and the center member and configured to allow each of the first wheel, the second wheel, and the center member to rotate about the axle; and
    wherein the wheel support base comprises a substantially rigid material adapted to protect the suitcase from damage.

6. The suitcase of claim 1, wherein the wheel support base comprises a wheel support connection extending past a lower portion of the wheel support base adapted to couple with the wheel carriage.

7. A double-sided wheel assembly for luggage for use on a ground surface, the double-sided wheel assembly for luggage comprising:
    a wheel member comprising:
        a first wheel oriented on a first plane;
        a second wheel oriented on a second plane parallel to the first plane; and
        a center member disposed entirely between and coupled with the first wheel and the second wheel and oriented on a third plane parallel to the first plane and the second plane, wherein the center member has a substantially annular shape and is configured to function as at least one bearing, the first wheel, the second wheel, and the center member adapted to distribute a load of the luggage to the first and the second wheel, wherein the center member rotates freely in a tangential direction relative to each of the first and second wheels when the wheel member is in use on a ground surface;
    a wheel carriage for supporting the wheel member;
    a wheel support base adapted to couple with the wheel carriage; and
    a luggage base adapted to couple with the wheel support base and secure the wheel support base to the luggage,
    wherein the luggage base comprises a connection member adapted to receive a fastener for securing the assembly to the luggage.

8. The assembly of claim 7, wherein the center member comprises at least one of a roller bearing, a ball thrust bearing, a roller thrust bearing, a tapered roller thrust bearing, or a needle bearing.

9. The assembly of claim 7, wherein the luggage base comprises a substantially convex shape conforming to an outer surface of the luggage.

10. The assembly of claim 7, wherein the luggage base comprises a protrusion adapted to couple the luggage base to the luggage and restrict lateral movement.

11. The assembly of claim 7, further comprising:
    an axle disposed through each of the first wheel, the second wheel, and the center member and configured to allow each of the first wheel, the second wheel, and the center member to rotate about the axle; and
    wherein the wheel support base comprises a substantially rigid material adapted to protect the luggage from damage.

12. The assembly of claim 7, wherein the wheel support base comprises a wheel support connection extending past a lower portion of the wheel support base adapted to couple with the wheel carriage.

13. The assembly of claim 7, wherein the wheel carriage comprises a wheel fork, the wheel fork comprising a first lateral prong and a second lateral prong, the wheel member disposed between and supported by the first lateral prong and the second lateral prong.

14. A double-sided wheel assembly for luggage for use on a ground surface, the double-sided wheel assembly comprising:
    a wheel member comprising:
        a first wheel oriented in a first plane;

a second wheel oriented in a second plane parallel to the first plane; and a center member disposed entirely between the first wheel and the second wheel and oriented in a third plane parallel to the first plane and the second plane, wherein the center member has a substantially annular shape, the center member comprising at least one bearing that comprises at least one of a roller bearing, a ball bearing, a ball thrust bearing, a roller thrust bearing, a tapered roller thrust bearing, or a needle bearing, wherein the first wheel, the second wheel, and the center member are adapted to distribute a load of the luggage to the first and the second wheel, and wherein the center member rotates freely in a tangential direction relative to each of the first and second wheels when the wheel member is in use on a ground surface;

a wheel carriage for supporting the wheel member, wherein the wheel carriage comprises a wheel fork, the wheel fork comprising a first lateral prong and a second lateral prong, the wheel member disposed between and supported by the first lateral prong and the second lateral prong;

a wheel support base adapted to couple with the wheel carriage; and a luggage base adapted to couple with the wheel support base and secure the wheel support base to the luggage, wherein the luggage base comprises a connection member adapted to receive a fastener for securing the assembly to the luggage.

15. A method of using a double-sided wheel assembly for use with luggage on a ground surface, the method of using a double-sided wheel assembly comprising:

providing a double-sided wheel assembly comprising:

a wheel member comprising:

a first wheel oriented on a first plane;

a second wheel oriented on a second plane parallel to the first plane; and a center member disposed entirely between and coupled with the first wheel and the second wheel and oriented on a third plane parallel to the first plane and the second plane, wherein the center member has a substantially annular shape and is configured to function as at least one bearing, the first wheel, the second wheel and the center member adapted to distribute a load of the luggage to the first and the second wheel, wherein the center member rotates freely in a tangential direction relative to each of the first and second wheels when the wheel member is in use on a ground surface;

providing a wheel carriage for supporting the wheel member;

providing a wheel support base adapted to couple with the wheel carriage;

providing a luggage base adapted to couple with the wheel support base and secure the wheel support base to the luggage, the luggage base comprising a connection member adapted to receive a fastener for securing the double-sided wheel assembly to the luggage; and securing the double-sided wheel assembly to the luggage.

16. The method of claim 15, further comprising providing the center member including at least one of a roller bearing, a ball thrust bearing, a roller thrust bearing, a tapered roller thrust bearing, or a needle bearing.

17. The method of claim 15, further comprising providing the luggage base with a substantially convex shape conforming to an outer surface of the luggage.

18. The method of claim 15, further comprising providing the luggage base with a protrusion adapted to couple the luggage base to the luggage and restrict lateral movement.

19. The method of claim 15, further comprising:

providing the double-sided wheel assembly with an axle disposed through each of the first wheel, the second wheel, and the center member and configured to allow each of the first wheel, the second wheel, and the center member to rotate about the axle; and providing the wheel support base with a substantially rigid material adapted to protect the luggage from damage.

20. The method of claim 15, further comprising providing the wheel support base with a wheel support connection extending past a lower portion of the wheel support base adapted to couple with the wheel carriage.

* * * * *